Figure 1:
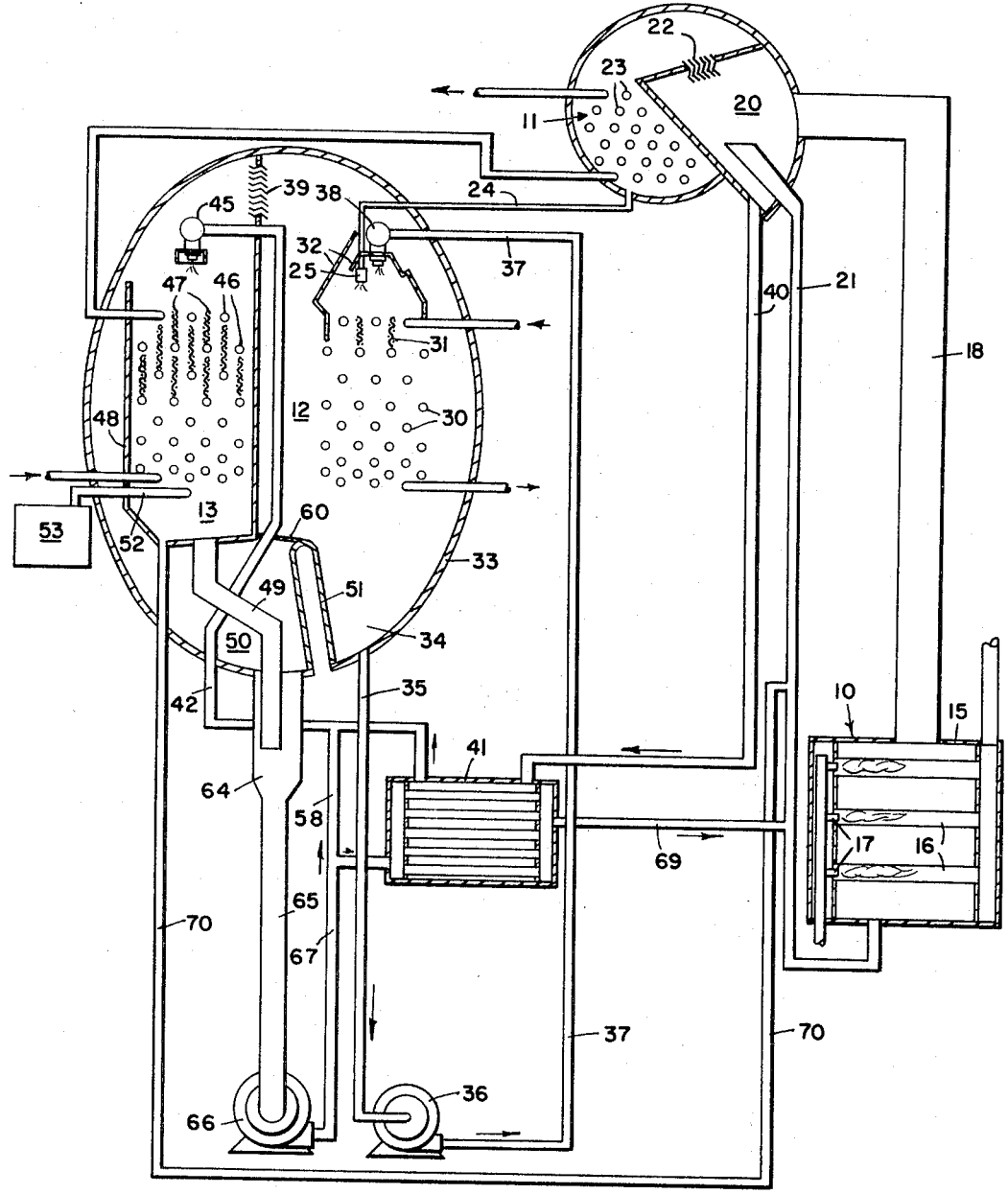

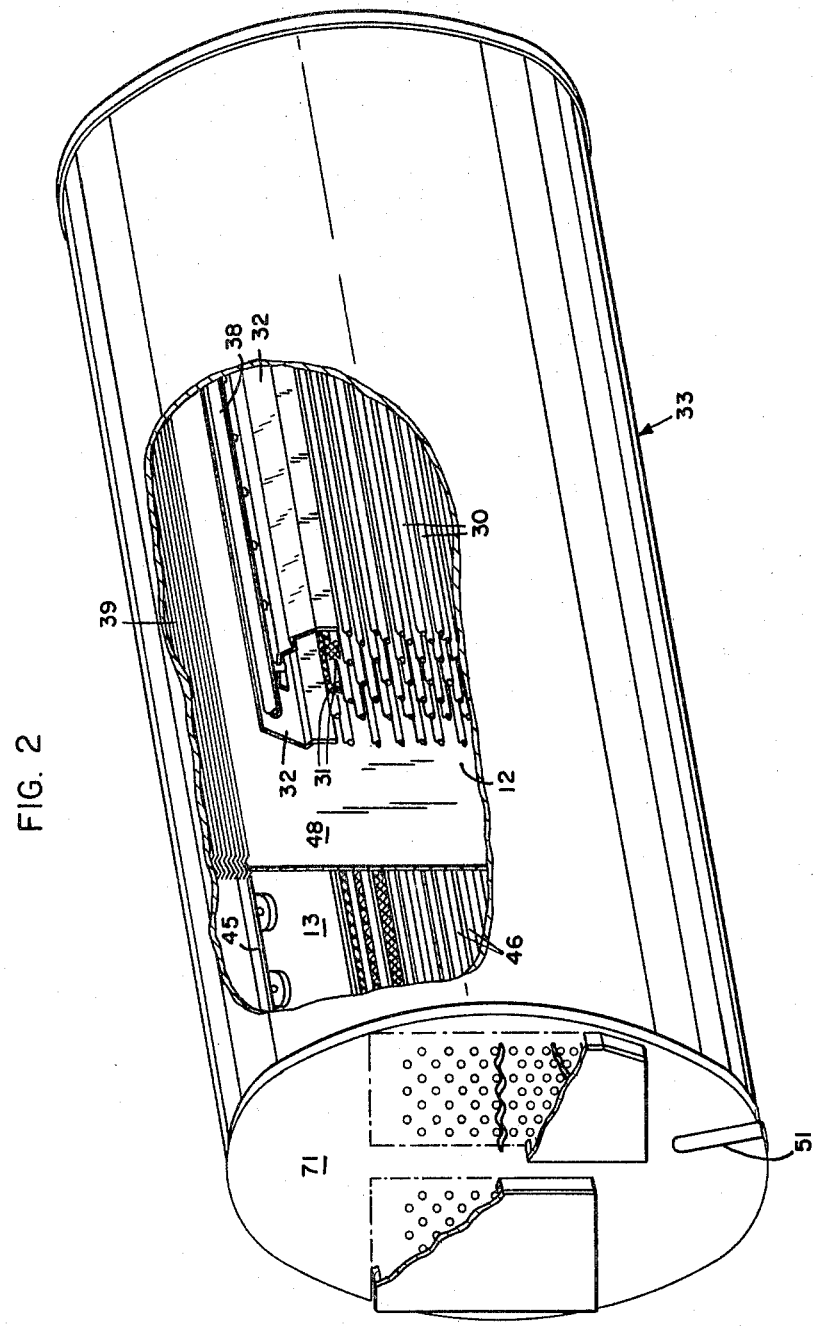

United States Patent Office 3,316,727
Patented May 2, 1967

3,316,727
ABSORPTION REFRIGERATION SYSTEMS
Joseph R. Bourne, De Witt, N.Y., assignor to Carrier Corporation, Syracuse, N.Y., a corporation of Delaware
Filed June 29, 1964, Ser. No. 378,655
9 Claims. (Cl. 62—101)

This invention relates to absorption refrigeration, and more particularly, to improved evaporator and absorber tube bundles.

Absorption refrigeration machines of the type described herein include a generator section, a condenser section, an evaporator section, and an absorber section connected to provide refrigeration. The absorber and evaporator sections each comprise a plurality of heat exchange tubes which are arranged in a tube bundle. A fluid to be cooled, such as water, is passed through the heat exchange tubes in the evaporator section where it is cooled. Heat is removed from the fluid passing through the evaporator tubes by spraying refrigerant liquid over their exterior surfaces. The liquid refrigerant absorbs heat from the fluid to be cooled and is vaporized in the evaporator section.

An absorbent solution, which has a strong affinity for refrigerant vapor, is sprayed over the tube bundle in the absorber section. The absorber and evaporator sections are open to each other so that as refrigerant is vaporized in the evaporator section it passes to the absorber section where it is absorbed by the absorbent solution, thus carrying the heat which was removed from the fluid to be cooled into the absorber. In order to promote absorption of refrigerant vapor by the absorbent solution, cooling water from a cooling tower or other source is passed through the interior of the heat exchange tubes in the absorber section where it cools the absorbent solution distributed over the tubes. In practice, most of the refrigerant vapor is absorbed in the film of absorbent solution lying on the surfaces of these heat exchange tubes.

It is well known that the presence of even very small quantities of relatively noncondensible gases, such as hydrogen or air in the absorber section, greatly inhibits the absorption of refrigerant vapor. These relatively noncondensible gases tend to insulate or "blanket" the heat exchange tubes in the absorber section forming a physical barrier to the passage of refrigerant into the film of cooled absorbent solution on the tubes. In a typical absorption refrigeration machine the pressure in the absorber section is less than one one-hundredth that of atmospheric pressure, and consequently air tends to leak into the system at joints and other connections. In comparison with refrigerant vapor, most of the gases in the air are relatively noncondensible and produce a very adverse effect on the capacity and performance of the absorption machine. Even if an absorption machine is made relatively air tight, the various metal parts must necessarily operate at different temperatures which gives rise to "galvanic corrosion." Also, steam formed in the generator reacts with iron to produce hydrogen gas. Not only do these forms of corrosion shorten the life of the machine, but one of their by-products is hydrogen gas which is relatively noncondensible, and produces a very adverse effect on the capacity of the machine.

To overcome the difficulties resulting from the accumulation of noncondensible gases in the absorber section, it is desirable to provide a purge arrangement for withdrawing these gases from the absorber and transferring them either to the atmosphere or to some other location in the system where their presence is not harmful. However, using conventional absorber tube bundle constructions, it is found that even with the most optimum location of the purge, noncondensible gases tend to remain in some section of the tube bundle and reduce the capacity of the machine.

These conventional absorber tube bundle constructions usually utilize a generally rectangular array of equally spaced, staggered heat exchange tubes with some means of liquid distribution, such as spray nozzles above the tube bundle to distribute absorbent solution downwardly over the bundle. In such arrangements most of the refrigerant vapor enters the top of the tube bundle and it will be apparent that substantially more refrigerant vapor passes the tubes near the portion of the tube bundle, where the refrigerant vapor enters, than at the lower portion thereof. Consequently, the quantity of refrigerant vapor and its velocity near the upper portion of the tube bundle is greater than is the quantity and velocity of vapor adjacent the lower portion thereof. Also, it has been found that the lower tubes in a conventional construction do substantially less useful work than the upper tubes, and consequently the capacity of the machine suffers. In accordance with this invention it has been found that when the pressure drop through the tube bundle is reduced and vapor velocity through a substantial portion of the absorber tube bundle is made relatively uniform, the performance of an absorption refrigeration machine having a given size absorber section is greatly improved.

Accordingly, it is an object of this invention to provide improved absorption of refrigerant vapor in an absorption refrigeration machine.

It is a further object of this invention to provide improved contact between refrigerant vapor and absorbent solution in the absorber of an absorption refrigeration machine.

It is a further object of this invention to provide an improved absorber construction which is compact in size and has a relatively low pressure drop.

It is a further object of this invention to provide an absorber construction such that the relatively noncondensible gases therein are swept through the tube bundle and are prevented from remaining in the bundle and from materially impairing the performance of the absorption machine.

In accordance with a preferred embodiment of the instant invention, these and other objects thereof are achieved by providing an absorber tube bundle construction wherein the absorber tubes adjacent the region in which the greatest quantity of refrigerant vapor flows are spaced apart by a distance greater than the absorber tubes in the region of the tube bundle wherein the least quantity of refrigerant vapor flows. It has been found that the desired variation in tube spacing and resultant uniformity of refrigerant vapor flow may be satisfactorily achieved by progressively decreasing the spacing between rows of equally spaced, staggered, absorber tubes. This enables the entire tube sheet to be drilled with the same set of equally spaced drills or otherwise formed by merely decreasing the distance between adjacent rows.

An absorption refrigeration machine made in accordance with this invention results in improved absorber performance by providing reduced pressure drop through the absorber tube bundle and improved contact between refrigerant vapor and absorbent solution, in comparison with uniformly spaced absorber tube bundle configurations, while at the same time minimizing the size of the tube bundle. An absorber constructed in accordance with this invention also possesses the advantage that the velocity of the vapor in the absorber section may be maintained sufficiently high and uniform throughout a substantial portion of the absorber tube bundle so as to sweep relatively noncondensible gases through the tube bundle without increasing the vapor velocity so high in any section thereof as to increase the pressure drop therethrough, or the velocity head required to accelerate the vapor from the evaporator so greatly, that the temperature in the evaporator rises and its performance suffers. At the same time the preferred spacing results in excellent wetting of the absorber tubes because absorbent solution drips from the tubes of the upper rows directly onto the tubes of the second row below them. Also, the spacing of absorber tubes in accordance with this invention results in improved uniformity of contact between vapor and cooled absorbent solution on the surfaces of the absorber tubes so that all of the tubes do about the same amount of work which results in improved capacity.

It has also been found that the performance of an evaporator utilizing a conventional tube bundle construction may be somewhat impaired because the evaporator tubes carrying the warmest fluid to be chilled generate more vapor than the evaporator tubes which are carrying cooler fluid. It will be seen that as fluid to be chilled passes through the evaporator tube bundle, its temperature is continually decreased and the capacity of the tubes through which it flows to generate refrigerant vapor is reduced. If the velocity of refrigerant vapor across any of the tubes of the evaporator tube bundle is too high, it may result in drying the tubes or in entraining refrigerant liquid in the vapor stream, both of which make the evaporator less efficient. One solution to this problem, of course, is to provide widely spaced evaporator tubes. It will be apparent, however, that with a conventional evaporator tube bundle construction, wherein all of the tubes are equally spaced, the tubes carrying the coolest fluid to be chilled would be spaced unnecessarily far apart in order to achieve proper spacing of the tubes carrying the warmest fluid. Such a construction would therefore result in an unnecessarily large and costly evaporator.

Accordingly, it is a further object of this invention to provide an improved evaporator construction.

In the illustrated embodiment of this invention, the above and other objects are achieved by spacing the evaporator tubes carrying the warmest water further apart than the evaporator tubes carrying more highly chilled water, thus resulting in a saving of evaporator space.

In the manufacture of an absorption refrigeration machine, it is a frequent practice to place both the evaporator and absorber sections in a single shell and to use a common tube sheet to support the ends of both the evaporator and absorber tube bundles. It will be apparent, therefore, that one of the advantages of employing the construction herein described in both the evaporator and absorber sections is the increased ease of manufacture of the tube sheet. It may be desirable to drill the apertures in the tube sheet for the evaporator section at the same time that the absorber section of the tube sheet is drilled. By making the absorber and evaporator sections in accordance with this invention, it is possible to drill the required apertures and tube sheets simultaneously since each of the rows of tubes in each section may be spaced from each other by the same distance. The required tube spacing is achieved merely by decreasing the distance progressively between each adjacent row of tubes as each row is drilled.

These and other objects of this invention will become more apparent by referring to the following detailed description and the attached drawings wherein:

FIGURE 1 is a diagrammatic view, partly in cross section, of an absorption refrigeration machine embodying an absorber and evaporator construction in accordance with the instant invention; and FIGURE 2 is an isometric view partly broken away of one embodiment of applicant's improved absorber and evaporator construction.

For purposes of illustration, one embodiment of this invention will be described wherein the absorption refrigeration machine may suitably employ water as the refrigerant and a solution of lithium bromide as the absorbent solution. As used herein, the term "strong solution" refers to a concentrated solution of lithium bromide, which is strong in absorbing power; the term "weak solution" refers to a dilute solution of lithium bromide, which is weak in absorbing power. It will be understood that the principles of this invention are applicable to a wide variety of absorption refrigeration machines as well as machines using other combinations of absorbent and refrigerants. An additive, such as 2-ethyl-n-hexanol and a suitable corrosion inhibitor may also be employed, if desired.

Referring particularly to FIGURE 1, there is shown an absorption refrigeration machine having a generator section 10, a condenser section 11, an evaporator section 12, and an absorber section 13, interconnected to provide refrigeration. It is preferred to include the evaporator and absorber sections within a single shell as shown in the drawings, but it will be appreciated that other configurations would be satisfactory and that the machine shown in the drawings is merely illustrative of one embodiment of applicant's invention.

Generator section 10 comprises a shell 15 having a plurality of fire tubes 16 passing therethrough. Gas jets 17 supply an ignited mixture of gas and air into fire tubes 16 to heat weak solution which is supplied to the generator. A vapor lift tube 18 extends from the top of shell 15. Weak solution is heated in generator section 10 to boil off refrigerant vapor and to thereby concentrate the weak solution. A mixture of concentrated absorbent solution and refrigerant bubbles rises upwardly through vapor lift tube 18 and passes into separator chamber 20. An equalizer line 21 is provided between the bottom of generator 10 and separator 20 to assist in stabilizing the generator boiling.

Condenser section 11 is conveniently contained in the same shell as separator 20 and comprises a plurality of heat exchange tubes 23. A cooling medium from a suitable source, such as a cooling tower, passes through condenser tubes 23. Refrigerant vapor separates from the mixture of absorbent solution passed to separator chamber 20 and passes to condenser section 11 through eliminators 22. The refrigerant vapor is condensed to liquid refrigerant in condenser section 11. Liquid refrigerant passes from condenser section 11 through condensate line 24 to spray nozzles 25 in evaporator section 12.

Evaporator section 12 comprises a plurality of heat exchange or evaporator tubes 30 disposed in a tube bundle located in a portion of shell 33. Water or other heat exchange fluid to be cooled is passed through evaporator tubes 30 in heat exchange with refrigerant supplied over the exterior surfaces thereof. Heat is absorbed from the water to be cooled by the refrigerant, thereby cooling the water in evaporator tubes 30 and vaporizing refrigerant on their exterior surfaces. The vaporized refrigerant passes from evaporator section 12 into absorber section 13 carrying with it the heat absoebed from the water passing through tubes 30. The chilled water may be circulated to suitable remote heat exchangers (not shown) to provide cooling or air conditioning as desired.

Evaporator tubes 30 are arranged in staggered rows such that the tubes of every other row are vertically aligned with each other and the tubes of immediately adjacent rows are disposed out of alignment with the tubes in adjacent rows, as illustrated in the drawing. Preferably, liquid distribution baffles 31, such as wire screens, are disposed between adjacent tubes in the first row of tubes. Screens 31 receive refrigerant sprayed over the tube bundle in the evaporator section and direct the refrigerant so that it drips onto lower tubes. This prevents refrigerant liquid from missing the lower rows of tubes and increases wetting of the entire tube bundle with refrigerant. Additional rows of tubes may also be provided with similar baffles, if desired. Suitable baffles 32 are provided in evaporator section 12 to direct refrigerant from the spray nozzle onto the tube bundle in the evaporator section.

Shell 33 includes an evaporator sump 34 containing unevaporated refrigerant liquid which drips off the lower rows of evaporator tubes 30. A refrigerant recirculation line 35 is connected to receive refrigerant from sump 34. The refrigerant is pumped through refrigerant pump 36 and recirculation line 37 to spray nozzles 38 where it is again discharged over the top of the tube bundle in the evaporator section.

As will be observed from FIGURES 1 and 2, the rows of evaporator tubes 30 are preferably spaced apart a greater distance near the upper portion of the tube bundle, adjacent which liquid refrigerant enters the tube bundle, than are the rows of tubes in the lower portion of the tube bundle, toward which the liquid refrigerant passes. The flow of cooling medium through the evaporator tubes is cicuited so that the warmest liquid flows through the upper rows of tubes, which are most widely spaced apart, and is progressively chilled as it passes through the lower rows of tubes in the bundle which are more narrowly spaced apart. It will be apparent that evaporator tubes 30 carrying the warmest fluid to be chilled will generate more refrigerant vapor than will the evaporator tubes carrying more highly chilled fluid and by this construction the restriction to flow of refrigerant vapor through the tube bundle is reduced. This may be satisfactorily and conveniently achieved by making the spacing between the evaporator tubes in each horizontal row the same while decreasing the vertical spacing between horizontal rows, and staggering adjacent rows of tubes as shown in the drawing.

By means of the construction shown, the velocity of refrigerant vapor flowing through the evaporator tube bundle may be maintained at a relatively or substantially constant or uniform low velocity throughout a substantial portion of the tube bundle even though a great deal more vapor passes by the upper tubes shown in the drawing. It is desirable to maintain the vapor velocity through the evaporator as low as possible, since any impediment to the flow of refrigerant vapor through the tube bundle, such as friction losses, represents a pressure rise which increases the evaporator temperature and decreases the efficiency of the machine. In addition, an excessively high vapor velocity in the evaporator section may cause particles of liquid refrigerant to be entrained in the vapor stream passing to the absorber section giving rise to poor machine efficiency. An absorption refrigeration machine made in accordance with this invention achieves these objects while maintaining a minimum size absorber tube bundle. Other satisfactory configurations of tubes in the evaporator tube bundle and other evaporator orientations may also be employed, if desired, which circuit the warmest fluid to be chilled through the most widely spaced evaporator tubes.

As previously explained, refrigerant vapor and absorbent solution from generator section 10 is separated in separation chamber 20. The concentrated absorbent solution, or strong solution, is passed from the lower portion of chamber 20 through strong solution line 40, through one side of heat exchanger 41, from which it flows through strong solution line 42 and is distributed by spray nozzles 45 over absorber tubes 46 to wet the absorber tubes.

Absorber section 13 is preferably also contained in shell 33 and comprises a plurality of heat exchange tubes 46 disposed in a tube bundle and arranged in rows of staggered tubes as previously described with respect to the heat exchange tubes in evaporator section 12. Suitable liquid distribution baffles 47, such as wire screens, may, if desired, be disposed between adjacent heat exchange tubes in the first few rows of heat exchange tubes 46 to enhance liquid distribution as also previously explained. Cooling water from a suitable source, such as a cooling tower, is passed through heat exchange tubes 46 to cool the absorbent solution sprayed on their exterior surfaces. The cooling water may be circuited so as to flow from absorber heat exchange tubes 46, through condenser tubes 23 to a cooling tower (not shown) where the cooling water is recooled and returned to the absorber tubes. Preferably the cooling water is circuited first through the lower tubes so as to maintain a more uniform temperature difference throughout the tube bundle.

An absorber pan 48 is arranged around the sides and bottom of the tube bundle in the absorber section to separate absorber section 13 from evaporator section 12 and to prevent absorbent solution from spray nozzles 45 from passing into the evaporator section. Eliminators 39 may or may not be provided in the vapor path between the absorber and evaporator sections. Absorber pan 48 also prevents refrigerant vapor from entering the sides of the tube bundle and confines the vapor flow to the region about the tubes. An absorber discharge conduit 49 collects absorbent solution which drips from the absorber tubes and discharges it into outlet 64 of solution storage sump 50, which is formed in the lower portion of the absorber section of shell 33 by a partition 51.

A purge line 52 having an opening adjacent the lower portion of the tube bundle in absorber section 13 is connected to a suitable purge unit 53. Purge unit 53 may be a jet purge of the general type shown in Leonard Patent 2,940,273, granted June 14, 1960, or it may be a vacuum pump type, or any other suitable type of purge.

In accordance with this invention absorber tubes 46 are disposed in absorber section 13 so that they are spaced apart by a greater distance in the region of the tube bundle adjacent which refrigerant vapor enters it, and preferably provides a relatively constant or uniform, generally unidirectional, flow of refrigerant vapor throughout a substantial portion of the absorber tube bundle. By this means, the flow of refrigerant vapor through the tube bundle serves to sweep noncondensible gases through the tube bundle into an opening in purge tube 52, so that these relatively noncondensible gases do not accumulate in the tube bundle and interfere with the absorber performance, without resulting in serious losses due to an unreasonably high pressure drop through the tube bundle. It will be appreciated that in practice it may not be feasible to provide a completely constant vapor flow velocity throughout the entire tube bundle. It has been found that the advantages inherent in the practice of this invention are satisfactorily achieved even when the velocity of vapor flow is greatly reduced in the region of the last row of absorber tubes toward which the refrigerant vapor flows in the tube bundle. Also, it has been found that a ratio of about two to one, between the velocity of refrigerant vapor entering the tube bundle and the velocity of refrigerant vapor across the next to the last row of absorber tubes results in greatly improved absorber performance compared to prior art construction wherein the absorber tubes are equally spaced throughout the tube bundle. Similarly, it has been found that it is not necessary for the purposes of this invention to design the absorber tube bundle with a tube spacing such that local variations in vapor flow velocity or direction, such as between tubes, are prevented, and there will be subsequently described a highly satisfactory and preferred absorber tube bundle construction wherein the control of maximum refrigerant velocity is achieved by varying the spacing between adjacent staggered rows of tubes, while maintaining the distance between the tubes in each row constant. As used herein, therefore, such terms as relatively or substantially constant or uniform vapor velocity are meant to distinguish the improved condition of uniformity of vapor flow described above, from that occurring in a conventional tube bundle wherein the tubes and rows of tubes are all substantially equally spaced from each other.

Even when the velocity of vapor through the tube bundle is not maintained substantially constant, improvement in absorber performance for a given physical size tube bundle will be obtained by varying the spacing of the tubes in the tube bundle so that the tubes on the side of the tube bundle adjacent which refrigerant vapor enters are more widely spaced apart than the tubes toward which the refrigerant vapor flows. This configuration reduces the pressure drop through the tube bundle and results in a more uniform contact between refrigerant vapor and absorbent solution, thereby resulting in a material improvement in absorber performance.

It will be observed that the lower portion of absorber pan 48 forms a surface adjacent the lower portion of the absorber tube bundle below the opening of purge tube 52 which is wetted with a thin film of relatively cool absorbent solution dripping from the tube bundle, and forms a surface for the absorption of additional refrigerant vapor. This surface serves to help maintain the relatively constant velocity of flow of refrigerant vapor through the tube bundle when optimum decreased tube spacing is not feasible by inducing unabsorbed vapor to pass completely through the tube bundle. Additional surface means, such as additional baffles or screens or additional heat exchange tubes, may be inserted below the tube bundle to provide additional absorption of refrigerant vapor in order to promote uniform flow of refrigerant vapor through the tube bundle.

Heat exchange tubes 46 are preferably disposed as shown in FIGURES 1 and 2 in the absorber tube bundle in a plurality of horizontal rows of equally spaced tubes. Immediately adjacent horizontal rows have the tubes therein arranged in staggered relation with each other. The absorber tubes in each row are preferably equally spaced from each other so that the tubes in every other row are in vertical alignment with each other. In this manner, wetting of the absorber tubes in the tube bundle is enhanced by dripping of absorbent solution from the tubes in one row onto the tubes in the second row therebelow. The horizontal rows are vertically spaced apart from each other by a progressively decreasing distance from the upper row, wherein refrigerant vapor enters the absorber tube bundle, toward the lower rows, to which the refrigerant vapor flows. The amount by which the rows of absorber tubes are progressively decreased in spacing is preferably calculated so as to maintain a relatively constant vapor velocity throughout a substantial portion of the tube bundle compared with conventional equally spaced tube bundle constructions. While the distance between tubes in each row is the same in each row, the progressively diminishing difference in spacing between the diagonally adjacent tubes of adjacent staggered rows, in the direction of refrigerant vapor flow through the tube bundle, maintains the desired uniformity of contact between vapor and the cooled absorbent solution which wets the exterior surface of the absorber tubes. Alternatively, or in addition, the number of tubes in each row may be progressively reduced, and suitable baffles provided about the tube bundle, so as to improve the uniformity of vapor velocity adjacent the lower portion of the tube bundle. Desirably, the vapor velocity is maintained sufficiently high and uniform throughout a substantial portion of the absorber tube bundle, to prevent a back or eddy flow of the noncondensible gases directly through the tube bundle into the inlet of the purge tube. However, the velocity of refrigerant vapor through the tube bundle should not be so great as to cause drying of absorber tubes, excessive friction losses, or to require a velocity head so high that the evaporator pressure undesirably rises and the improved absorber performance is offset by the rise in evaporator pressure necessary to accelerate the refrigerant vapor through the absorber tube bundle. A satisfactory vapor velocity in the absorber tube bundle may be empirically determined for each machine construction.

By the practice of this invention the pressure drop through the absorber tube bundle is reduced and a more uniform contact between refrigerant vapor and absorbent solution is obtained. Also, the construction is readily adapted to maintain a more uniform refrigerant vapor velocity through the tube bundle than prior constructions so that relatively noncondensible gases may be swept out of the tube bundle and their adverse effect on absorber performance is mitigated. It will be appreciated that other configurations of tubes within the absorber tube bundle, and other orientations of the absorber section, than that illustrated may also be employed within the scope of this invention. However, the spacing between the absorber tubes is preferably arranged as shown in the drawing so as to decrease in a suitable manner in the direction toward which the refrigerant vapor flows so that the total unabsorbed refrigerant vapor flows through a progressively diminishing or more restricted space as it passes through the absorber tube bundle and is absorbed into the cooled absorbent solution on the exterior surfaces of the absorber tubes.

The configuration shown in the drawings is particularly avantageous because it permits both absorber and evaporator sections of the tube sheet 71 shown in FIGURE 2 to be drilled at the same time by aligning the horizontal rows of tubes of both the evaporator and absorber sections. Also, the same set of drills may be employed to drill each of the horizontal rows because it is not necessary to change the spacing between the drills, although the number of holes and their position may vary in alternate rows and be different in size and in number in the two sections. The desired variation in spacing between the tubes may be achieved by merely indexing the set of drills so as to move a lesser distance as each lower row of tubes is drilled. Two sets of drills may desirably be used and each set used to drill every other row, so as to provide the staggered array. In practice, it has been found that this system provides a satisfactory constant vapor velocity in both absorber and evaporator sections. It will also be observed that applicant's mproived absorber and evaporator construction minimizes the vertical space required and thereby results in a more compact tube bundle construction.

A baffle 60 is provided between absorber pan 48 and evaporator section 12 to prevent unwanted refrigerant draining into the absorber section. Absorbent solution is withdrawn from the absorber section through weak solution line 65 and passed by pump 66 through line 67 through the other side of heat exchanger 41 and line 69 to equalizer line 21 where it is forwarded to the generator section for reconcentration. A portion of the weak solution from pump 66 may be passed through weak solution recirculating line 58 so as to mix with concentrated absorbent solution in line 42 and recirculation through spray nozzles 45.

A solution loop line 70 is provided between equalizer line 21 in an appropriate height, and the lower portion of absorber pan 48. Line 70 serves to maintain the proper solution level in generator section 10 on startup.

Absorption refrigeration machines made in accordance with this invention have been found to produce significantly improved performance over that of machines having conventional tube bundles therein. While the absorption refrigeration machine described embodies the principles of this invention in both absorber and evaporator tube bundles, it will be appreciated that the invention may be applied to either of these sections alone, and in particular to the absorber alone, if desired. It will also be appreciated that other orientations and configurations of evaporator and absorber sections can be constructed within the scope of this invention. For example, the evaporator construction could be inverted from that illustrated so that the refrigerant vapor flows downwardly through the tube bundle and is removed in the lower portion thereof, or otherwise rotated with respect to the absorber. In this event, the tubes carrying the warmest fluid to be chilled would be located adjacent the lower portion of the tube bundle and, in accordance with this invention, would be more widely spaced than the tubes carrying more highly chilled fluid. Other absorber constructions may also be constructed within the scope of this invention wherein the space through which the refrigerant vapor flows is suitably decreased from the point at which refrigerant vapor enters the tube bundle toward the direction in which it flows.

It will therefore be appreciated that this invention may otherwise be embodied within the scope of the following claims.

I claim:

1. An absorption refrigeration machine having an absorber section comprising a shell; a tube bundle within said shell comprising a plurality of heat exchange tubes for cooling an absorbent solution; means to distribute absorbent solution onto the exterior surfaces of said heat exchange tubes; an inlet into said absorber section for admitting refrigerant vapor to be absorbed in the region of said heat exchange tubes; a purge passage for withdrawing relatively noncondensible gases from said absorber section to reduce their accumulation therein; said heat exchange tubes lying in a plurality of vertically aligned horizontally parallel rows arranged so that absorbent solution drips from the upper rows of heat exchange tubes and uniformly wets the tubes in lower rows; said heat exchange tubes being spaced apart by gradually diminishing distances from a region of said tube bundle at which refrigerant vapor enters the tube bundle, toward the region of said tube bundle toward which the refrigerant vapor flows; said purge passage having inlet means adjacent said region of the tube bundle toward which the refrigerant flows, so that said relatively noncondensible gases are swept through said tube bundle toward said purge passage inlet by the refrigerant vapor.

2. An absorption refrigeration machine as defined in claim 1 wherein said absorber section includes a surface disposed adjacent the region of said tube bundle toward which said refrigerant vapor flows, said surface being wetted with a thin film of absorbent solution capable of absorbing refrigerant vapor, and said purge passage inlet being disposed between said wetted surface and said tube bundle so that said surface serves to induce some refrigerant vapor to pass through said absorber tube bundle to aid in sweeping said relatively noncondensible gases out of said tube bundle.

3. An absorption refrigeration machine comprising a generator section, a condenser section, an evaporator section, and an absorber section for the absorption of refrigerant vapor; said absorber section comprising a tube bundle having a plurality of heat exchange tubes therein; means to wet the exterior surface of said heat exchange tubes with absorbent solution; said heat exchange tubes being disposed in a plurality of horizontal rows of equally spaced tubes, at least some of said rows having tubes therein which are staggered with respect to the tubes in an adjacent row, the heat exchange tubes in the staggered rows of heat exchange tubes being disposed in vertical alignment with the heat exchange tubes in other correspondingly staggered rows and arranged so that absorbent solution drips from the upper heat exchange tubes to uniformly wet the lower heat exchange tubes in correspondingly staggered rows, and at least some of said rows of tubes being spaced apart from each other by progressively diminishing distances from the region of said tube bundle adjacent which refrigerant vapor enters the tube bundle toward the region of said tube bundle toward which the refrigerant vapor flows.

4. An absorption refrigeration machine comprising a generator section, a condenser section, an evaporator section and an absorber section connected to provide refrigeration; said absorber section comprising a tube bundle disposed within a shell so that refrigerant vapor enters adjacent substantially only the top of said tube bundle; a purge opening disposed adjacent the bottom of said tube bundle; said tube bundle comprising a plurality of horizontally extending rows of equally spaced tubes, said plurality of horizontally extending rows being arranged so that tubes in adjacent rows are disposed in staggered relation with each other, the heat exchange tubes in the staggered rows of heat exchange tubes being disposed in vertical alignment with the heat exchange tubes in other correspondingly staggered rows and arranged so that absorbent solution drips from the upper heat exchange tubes to uniformly wet the lower heat exchange tubes in correspondingly staggered rows, the vertical distance between at least some adjacent rows of tubes decreasing from the top of said tube bundle, adjacent which refrigerant vapor enters the tube bundle toward the bottom of the tube bundle toward which the refrigerant vapor flows; and means to discharge absorbent solution over the top of said absorber tube bundle.

5. A method of absorbing refrigerant vapor into an absorbent solution in an absorption refrigeration machine, said machine including an absorber tube bundle which comprises a plurality of heat exchange tubes disposed in a plurality of staggered rows, said heat exchange tubes being arranged in a plurality of vertically aligned horizontally parallel rows, at least some of said rows being spaced apart by a progressively diminishing distance from one region of said tube bundle toward another region thereof, which comprises the steps of:
    wetting the exterior surfaces of said plurality of spaced heat exchange tubes by discharging an absorbent solution onto the exterior surfaces of said tubes;
    cooling the absorbent solution on the exterior surfaces of said heat exchange tubes by passing a cooling medium through the interior of said heat exchange tubes; and
    passing said vapor through progressively more restricted spaces between said heat exchange tubes from said one region of said tube bundle to said other region thereof, while simultaneously reducing the quantity of said vapor passing through said tube bundle from said one region to said other region thereof by absorbing vapor into the cooled absorbent solution on the exterior surfaces of said heat exchange tubes.

6. A method of absorbing refrigerant vapor into an absorbent solution in an absorption refrigeration machine, said machine including an absorber tube bundle which comprises a plurality of heat exchange tubes disposed in a plurality of staggered rows, said heat exchange tubes being arranged in a plurality of vertically aligned horizontally parallel staggered rows, at least some of said rows being spaced apart by a progressively diminishing distance from one region of said tube bundle toward another region thereof, which comprises the steps of:
    wetting the exterior surfaces of said plurality of spaced heat exchange tubes by discharging an absorbent solution onto the exterior surfaces of said tubes and by directly dripping solution from the upper tubes to the lower vertically aligned tubes;
    cooling the absorbent solution on the exterior surfaces of said heat exchange tubes by passing a cooling medium through the interior of said heat exchange tubes;
    passing refrigerant vapor through said the progressively more restricted absorber tube bundle at a substantially uniform velocity from said one region of said tube bundle to said other region thereof while simultaneously reducing the quantity of vapor passing through said tube bundle by absorbing vapor into the cooled absorbent solution on the exterior surfaces of said heat exchange tubes; and
    withdrawing relatively noncondensible gas from said absorber tube bundle adjacent said other region thereof so that the relatively noncondensible gas is passed through said tube bundle at a sufficiently uniform velocity to substantially inhibit accumulation of the noncondensible gas in the region of said heat exchange tubes.

11

7. An absorption refrigeration machine comprising a generator, a condenser, an evaporator section for vaporizing a refrigerant liquid, and an absorber section for absorbing refrigerant vapor, said absorber section and said evaporator section each having a tube bundle therein comprising a plurality of heat exchange tubes arranged in a plurality of vertically aligned horizontally parallel staggered rows, means to distribute absorbent solution over the top of the tube bundle in said absorber section to wet each tube therein with absorbent solution, means to distribute liquid refrigerant over the top of the tube bundle in said evaporator section to wet each tube thereof with liquid refrigerant, a single tube sheet adjacent one end of said absorber and evaporator sections, said tube sheet having a plurality of apertures formed therein forming fluid passages through said tube sheet for communication with said heat exchange tubes, said heat exchange tubes of said absorber section and the evaporator section being secured to said tube sheet in communication with one of the corresponding apertures formed therein, said apertures and their corresponding tubes being arranged in a plurality of horizontal rows, each of said rows comprising a plurality of equally spaced apertures having corresponding tubes communicating therewith, and at least some of said rows being vertically spaced apart by different distances, and having the tubes therein staggered with respect to the tubes of adjacent rows, so that said tubes in both said evaporator section and said absorber section have correspondingly differing distances between adjacent tubes in adjacent rows, each of said tubes in both said evaporator and said absorber sections being spaced apart by a greater distance in the region of said tube bundles where the volume of refrigerant vapor is the greatest than in the region of said tube bundles where the volume of refrigerant vapor is the least.

8. An absorption refrigeration machine having an evaporator section comprising a shell; a tube bundle disposed within said shell, said tube bundle comprising a plurality of heat exchange tubes for passage of a fluid medium to be cooled; means to discharge liquid refrigerant over the top of said heat exchange tubes to wet each of said tubes; said heat exchange tubes arranged in a plurality of horizontally extending rows of equally horizontally spaced tubes throughout, means to support said tubes vertically aligned with respect to each other so that unevaporated liquid refrigerant drips from the upper tubes onto the lower vertically aligned tubes to evenly wet the lower heat exchange tubes; means to support at least some of said horizontal rows of tubes vertically spaced apart by a gradually diminishing distance through said tube bundle; and means to circuit said fluid medium through said heat exchange tubes in a manner so that tubes carrying relatively warm fluid medium are spaced apart a greater distance than heat exchange tubes carrying relatively cool fluid medium.

9. An absorption refrigeration machine as defined in claim 8 wherein said heat exchange tubes are arranged in a plurality of vertically aligned staggered rows.

References Cited by the Examiner

UNITED STATES PATENTS

| | | | |
|---|---|---|---|
| 751,058 | 2/1904 | Cracknell | 165—117 X |
| 2,193,535 | 3/1940 | Maiuri | 62—101 |
| 2,817,498 | 12/1957 | Miller | 165—159 X |
| 2,991,048 | 7/1961 | Rabin | 165—159 X |
| 3,081,605 | 3/1963 | Leonard | 62—112 X |
| 3,158,008 | 11/1964 | Aronson | 62—476 |
| 3,200,604 | 8/1965 | Greeley et al. | 62—476 X |

FOREIGN PATENTS

| | | |
|---|---|---|
| 686,378 | 1/1953 | Great Britain. |
| 19,566 | 7/1899 | Switzerland. |

LLOYD L. KING, *Primary Examiner.*